Figure 1:
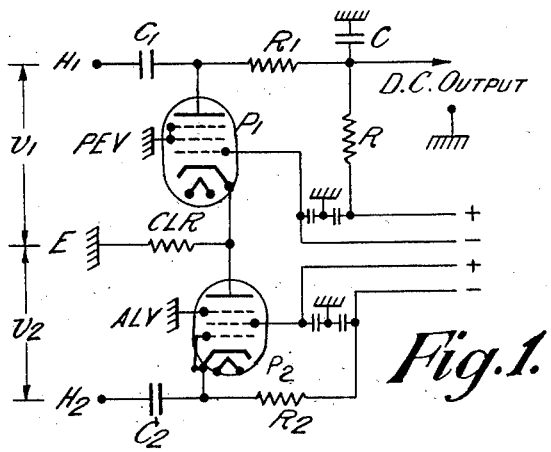

April 15, 1952    MOHAMED ABDU HASSAN EL-SAID    2,593,281

VACUUM-TUBE MIXER AND CIRCUITS THEREFOR

Filed July 8, 1947                                                 6 Sheets-Sheet 1

Inventor.

M. A. H. El-Said,

By Baldwin, Wight & Brent

Attorneys

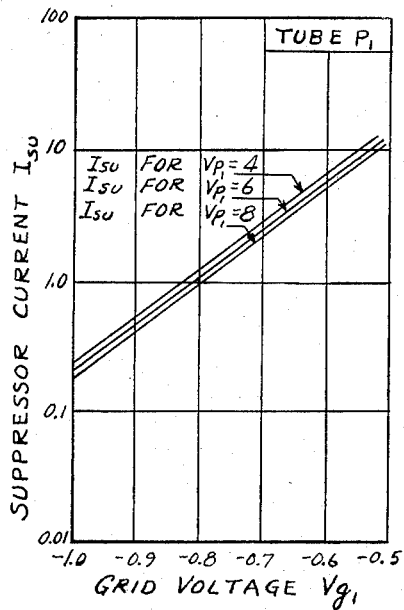
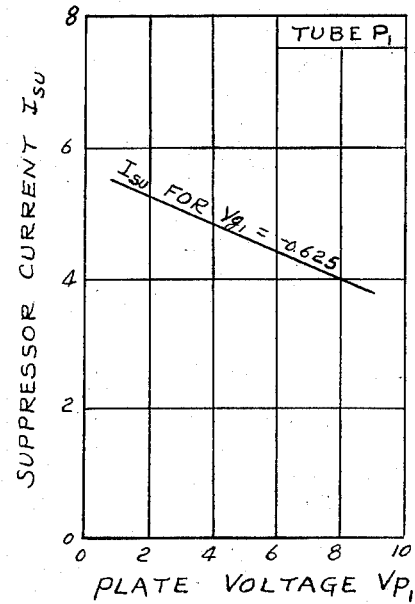
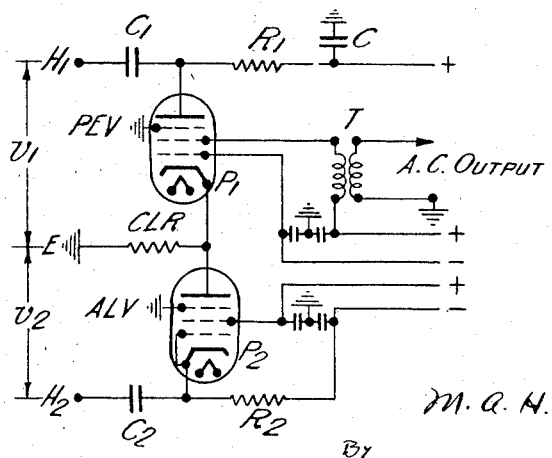

April 15, 1952    MOHAMED ABDU HASSAN EL-SAID    2,593,281
VACUUM-TUBE MIXER AND CIRCUITS THEREFOR
Filed July 8, 1947                                                                    6 Sheets-Sheet 4

Inventor.
M. A. H. El-Said
By Baldwin, Wight & Brown
Attorneys

Inventor.
M. A. H. El-Said

Patented Apr. 15, 1952

2,593,281

UNITED STATES PATENT OFFICE 2,593,281

VACUUM-TUBE MIXER AND CIRCUITS THEREFOR

Mohamed Abdu Hassan El-Saïd, Giza, Egypt

Application July 8, 1947, Serial No. 759,623
In Great Britain June 18, 1947

7 Claims. (Cl. 172—245)

This invention relates to valve mixer circuits and has for its object to provide improved mixer circuits for combining and multiplying independent electrical waves. Though not limited thereto the invention is particularly applicable for use in connection with and is primarily intended for valve measuring instruments such as wattmeters, wave-analyzers, power-factor meters, and phase-angle meters for measurements within the frequency range extending from the lowest audio frequency up to high frequencies of the order of 50 megacycles per second. Mixers for such purposes must be reliable and predictable in performance and produce the required multiplication effect with a close degree of accuracy. The present invention enables these requirements to be satisfied by apparatus of simple and economical construction and arrangement.

According to this invention a mixer circuit includes two electron discharge paths in series, means for applying one of the waves to be mixed to one path, means for applying the other of the waves to the other path, and means for taking the required mixed output from one or other of said paths, said paths being so arranged and operated that one operates within a family of characteristics as described hereinafter and the other operates over a single logarithmic characteristic, the said paths being so pre-adjusted and coupled that the change in the output is proportional to the instantaneous multiplication of said two input waves. By the expression "operates within a family of characteristics" as employed in this specification and claims is meant that the path in question is so adjusted and operated that the dependent variable of the family varies exponentially with respect to one independent variable thereof and linearly with respect to the other thereof, the mathematical power or index of the exponentials being constant. Under this condition the dependent variable of the family is proportional to the product of an exponential function of one independent variable and a linear function of the other independent variable.

The basic principle provided by and utilized in the carrying out of the invention accordingly resides in the securing of the required multiplication by the combination of a family of characteristics (as above defined) with a single logarithmic characteristic, the said single characteristic being so adjusted with relation to the exponential action of the family that the superimposition of the logarithmic and exponential actions results in an overall linear system.

In general the invention can be carried into practice by means of two valves in series, one providing the said family and the other operating with a single logarithmic characteristic.

The inputs to be mixed will depend for their nature upon requirements. Thus, where the invention is to be employed to provide a wattmeter one will be a voltage wave and the other a current wave. In other cases both may be voltage waves or both may be current waves.

The invention is illustrated in and further explained in connection with the accompanying drawings.

In most of the figures the general designating references PEV, ALV and CLR appear. PEV designates the principal exponential valve and the ALV the auxiliary logarithmic valve, and CLR is a coupling linear resistor. Throughout the circuit diagram figures minor circuit details are omitted so as to simplify the figures so that they illustrate the invention clearly without being complicated by feed supply and similar circuit details well known per se.

Referring first to Fig. 1 which illustrates in simplified diagram form an embodiment, two pentodes $P_1P_2$ are used, though any other suitable valves could be substituted. The cathode of $P_1$ is connected to the anode of $P_2$ and the junction point is earthed through the coupling resistance CLR. The two input waves to be mixed are input voltages $v_1$ and $v_2$ and are applied respectively to $P_1$ and $P_2$ through appropriate coupling capacitors $C_1$ and $C_2$. The whole circuit has thus three input terminals, $H_1$ (for $P_1$) and $H_2$ (for $P_2$) and E (common earth). The useful output is a direct current voltage taken across a load resistor R from the anode circuit of $P_1$. A resistance $R_1$, is included between the "live" output terminal and the anode of $P_1$. The load resistance R is by-passed to earth by a capacitor C. A resistance $R_2$ is included between the cathode of $P_2$ and the negative HT.

Figure 2A:
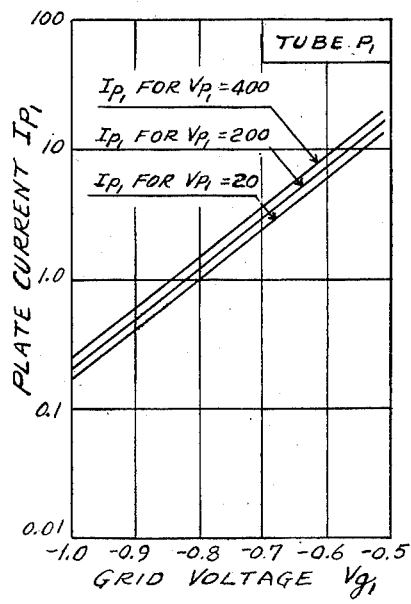
Figure 2B:
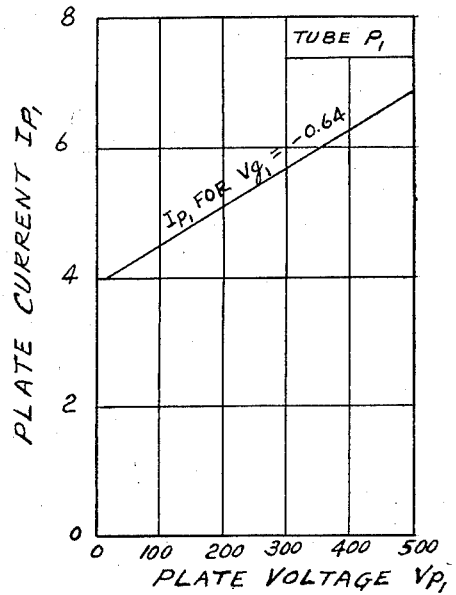
Figure 2C:
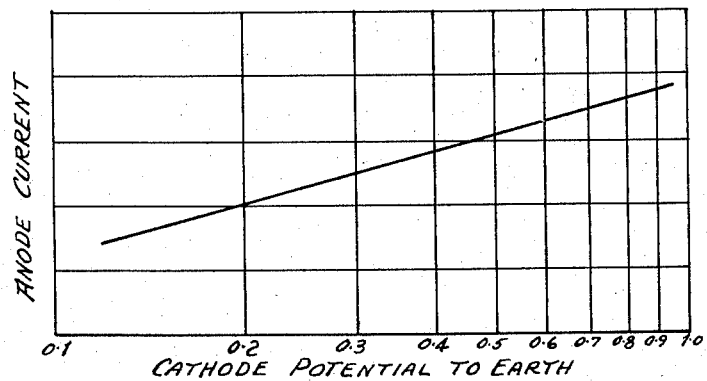

Pentode $P_1$ is set to operate within a family of characteristics as above defined while $P_2$ is set to operate in a region in which the anode current-cathode voltage characteristic is logarithmic. These terms will be fully understood upon reference to Figs. 2a, b, and c which illustrate them. In Fig. 2a, which shows the regime of $P_1$ anode current is plotted, to a logarithmic scale, against a linear scale of grid-to-cathode potential, giving a family of straight parallel lines marked $I_{p_1}$ for $V_{p_1}=20$, $V_{p_1}=200$, and $V_{p_1}=400$ for different values of anode potential. In Fig. 2b, which shows the same operating regime of $P_1$ anode current is plotted against anode voltage (both the linear scales) giving a straight line result for any constant grid-cathode potential within the exponential regime. In Fig. 2c, which shows the logarithmic regime of $P_2$ a straight line results from plotting anode current to a linear scale, against cathode potential with respect to earth to a logarithmic scale. Thus $P_1$ is set to operate in that (1) exponential anode current-grid voltage characteristics are obtained for constant values of anode voltages; (2) the mathematical power of the exponentials in (1) is constant and independent of anode voltages (note the parallelism of the lines of Fig. 2a); and (3) for any constant value of grid-voltage (within the exponential regime) the anode current-anode voltage characteristic is linear as in Fig. 2b. Under these conditions the plate current of $P_1$ is accurately proportional to the product of an exponential function of the grid voltage and a linear function of the plate voltage. Such a family of characteristics as in Figs. 2a and 2b can be obtained in practice by operating multi-grid tubes under retarding-field conditions. To clarify this practically, I found that, for instance, when the screen grid voltage of a tetrode or a pentode is reduced to a value near cathode potential, and the grid voltage is sufficiently negative so that a virtual cathode is formed near the grid, the plate current is accurately proportional to the product of an exponential function of grid voltage and a linear function of plate voltage over wide ranges. In this region of operation the plate current in microamperes is determined by the Maxmillian electron initial velocity distribution and occurs at grid voltages more negative than those for which the three halves power law holds. As already stated $P_2$ as shown in Fig. 2c operates within a region where the anode current-cathode voltage characteristic is logarithmic. It should be understood that the magnitude of the plate current of $P_2$ should be much larger than the cathode current of $P_1$ so that the feed-back from $P_1$ into $P_2$ may be negligibly small.

The magnitude of the coupling linear resistor CLR is so adjusted that the superimposition of the logarithmic characteristic of $P_2$ upon the exponential characteristic of $P_1$ results in a strictly linear system. To secure this condition, the magnitude of CLR is predetermined from the slopes of the curves in Figs. 2a and 2c. In practice CLR may with advantage be adjustable to enable best results to be obtained experimentally. For the particular curves in Figs. 2a and 2c, the values of the slopes are approximately 9 volts$^{-1}$ and 240 microamperes, respectively, thus giving a value of CLR about 460 ohms.

As will now be appreciated the circuit of Fig. 1 operates in such manner that the change in the anode current of $P_1$ consequent upon the application of $v_1$ and $v_2$ comprises a repeating term for $v_1$, a repeating term for $v_2$ and a product of multiplication term $v_1v_2$. The change in the direct current component of the anode current of $P_1$ consequent upon the application of $v_1$ and $v_2$ is thus proportional to the mean value of $v_1v_2$. It should be clearly understood that in the absence of tube $P_2$ and with $v_2$ applied to the grid of tube $P_1$ the change in plate current of $P_1$ consequent upon application of both voltages includes a component proportional to the product of $v_1$ into an exponential function of $v_2$. When $v_2$ is infinitesimally small, this product component reduces to $(v_1v_2)$ but the output will accordingly be small. In order to increase the magnitude of this product component by increasing the grid voltage excursion due to $v_2$, and at the same time maintaining the proportionality, it is necessary to compensate for the instantaneous value of the exponential curvature producing plate rectification. For this purpose, tube $P_2$ is introduced merely to distort the wave form of $v_2$ on a proper logarithmic curvature so as to compensate accurately the instantaneous plate rectification caused by the inherent exponential grid curvature of tube $P_1$. The said "proper" logarithmic curvature is obtained by the adjustment of the coupling impedance CLR.

Figure 3:
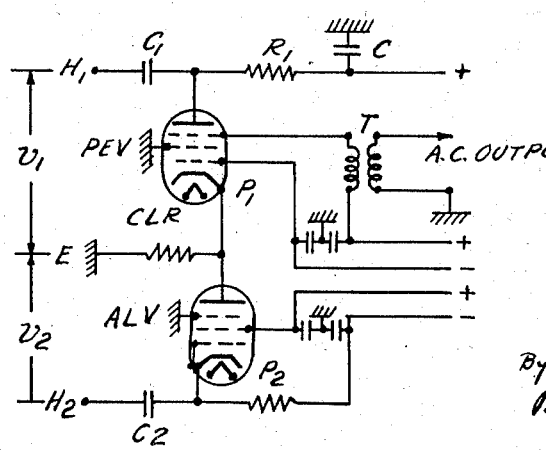

The embodiment of Fig. 3 is generally similar to that of Fig. 1 but is designed for the case of a useful alternating output, the said output being taken from the suppressor grid of $P_1$ through a transformer T instead of, as in Fig. 1, from the anode of pentode $P_1$. The transformer T is, of course, only one example of an output device and any other suitable device, e. g. a fixed or variably tuned resonant circuit a crystal resonator or resistance-capacity coupling could be used.

Pentode $P_1$ is set to operate within a family of curves as graphically shown by Figs. 4a and 4b. These figures differ from Figs. 2a and 2b respectively only in that the ordinates are suppressor grid current values instead of anode current values. The curves are characterized in that (1) for one constant value of suppressor grid voltage, and for various constant values of anode voltages, the suppressor current-grid voltage characteristics are exponential; (2) the mathematical power of the exponentials in (1) is constant and independent of anode voltages (note the parallelism of the lines in Fig. 4a); and (3) for any constant value of grid voltage (within the exponential regime) and for the same constant suppressor grid voltage in (1) the suppressor current-anode voltage characteristic is linear.

Pentode $P_2$ is set to operate as already explained in connection with Fig. 2c within a region where the anode current-cathode voltage characteristic is logarithmic.

The magnitude of the coupling linear resistor CLR is again adjusted so that the superimposition of the single logarithmic characteristic of $P_2$ upon any and all the exponential characteristics of $P_1$ results in a strictly linear system.

The change in the suppressor grid current of $P_1$ consequent upon the application of $v_1$ and $v_2$ comprises a repeating term for $v_1$ a repeating term for $v_2$ and a multiplication term $v_1v_2$. The two beat frequency components of $v_1$ and $v_2$ are thus present as components in the suppressor grid current of $P_1$ and the amplitude of these beat frequency components is proportional to the product of the amplitudes of $v_1$ into $v_2$.

The embodiment of Fig. 5 differs from that of Fig. 3 only in that in Fig. 5 the screen grid of $P_1$ is used to perform the functions for which the suppressor grid is used in Fig. 3. In Fig. 5 therefore the change in the screen grid current of $P_1$ consequent upon the application of $v_1$ and $v_2$ comprises a repeating term for $v_1$, a repeating term for $v_2$ and a product term $v_1v_2$. The two beat frequency components of $v_1$ and $v_2$ are thus present in the screen grid current of $P_1$ and the amplitude of these beat frequency components is proportional to the product of the amplitudes of $v_1$ into $v_2$. The family of characteristics shown in Figs. 4a and 4b for tube $P_1$ in Fig. 3, and the corresponding family for tube $P_1$ in Fig. 5 can be obtained in practice from multigrid tubes operated under retarding-field conditions. In both cases, the output electrode of the tube should be operated at a fixed positive potential, being in some tubes about 50 volts, whereas the plate potential is relatively low, being about several volts. Under these conditions I found that the current in the output electrode is accurately proportional to the product of an exponential function of grid voltage and a linear function of the plate voltage over a limited range of plate voltage.

Figure 6:
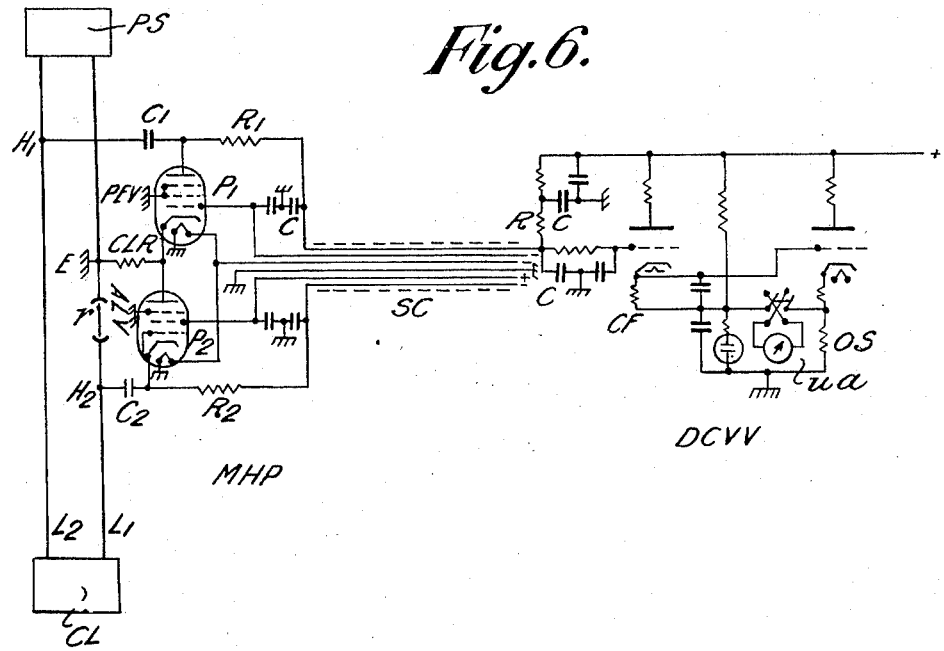

Figs. 1, 3 and 5 may be described as three forms of the basic mixer circuit of the invention. Fig. 6 shows a specific application of the invention employing one of the basic circuit forms.

Referring to Fig. 6 which shows a valve wattmeter employing the basic mixer circuit of Fig. 1 the elements of this basic mixer circuit are included in a measuring head MHP which is connected to a direct current valve voltmeter DCVV by means of a screened cable SC. Element PEV is connected across the wires $L_1$ and $L_2$ connecting a source of power PS to a power consuming load CL, and is to be considered as the voltage element of the wattmeter. Element ALV is connected across a resistor schematically represented at $r$ which is inserted in one of the wires $L_1$, and through which the whole of the current passes through the power consuming load. ALV is to be considered as the current element of the wattmeter. The voltmeter DCVV comprises a cathode-follower stage CF followed by a conventional output stage OS. The coupling between these stages includes a neon tube or like gas discharge device. In the circuit of the output stage OS is a double pole reversing switch with which an indicating microammeter $ua$ is connected as shown. The direct current valve voltmeter shown forms per se no part of this invention and may be replaced by any other suitable well known form. In view of the description already given in connection with Fig. 1 no further description of the circuit of Fig. 6 is thought necessary except to point out that the indication given by the instrument $ua$ in the direct current valve voltmeter unit DCVV—is proportional to the mean value of the instantaneous product of the voltage across and the current through the wires $L_1$ and $L_2$, i. e. is proportional to the mean power passing from the source to the load. It will be observed that the wattmeter is connected to the wires $L_1$ and $L_2$ in such manner that the source side of wire $L_1$ is earthed. It is however equally possible to connect the wattmeter so that the load side of wire $L_1$ is earthed in which case of course the indicated reading of $ua$ will be in the reverse direction.

Switching provision may be made so that either the voltage element or the current element of the wattmeter can be used separately to measure the voltage or the current in the circuit. Such switching provision will be apparent to those skilled in the art and is therefore, for simplicity, not included in Fig. 6.

Figure 7:
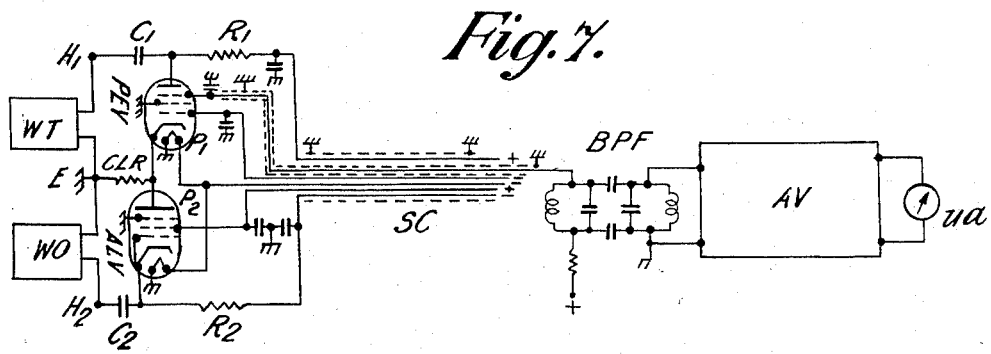

Fig. 7 shows a wave analyzer in accordance with the invention and using the mixer circuit of Fig. 3. This mixer circuit is housed in a measuring head MHWA which is connected to a valve A. C. voltmeter unit ACVV by a screened cable SC. The complex wave form to be tested is applied from a source WT to PEV whilst a locally produced sinusoidal oscillatory wave of frequency $$\frac{w_0}{2\pi}$$

is applied to ALV from a source WO. The voltmeter unit ACVV includes a band-pass filter circuit BPF fixed tuned to a frequency $$\frac{w_s}{2\pi}$$

followed by an amplifier and conventional thermionic voltmeter circuit AV with an indicating microammeter $ua$.

The suppressor grid current of $P_1$ contains the two beat frequency components, produced by the multiplication of the complex wave $(e)$ and the oscillatory wave $(e_0)$ from sources WT and WO. When the frequency $$\frac{w_0}{2\pi}$$

of the local oscillator is adjusted with respect to any of the component frequencies of the complex wave to be tested, the mixer gives beat frequency components represented by $$KE_0E_n \cos\,(w_0+w_n)t$$

(the upper beat) and $$KE_0E_n \cos\,(\pm w_0 \mp w_n)t$$

(the lower beat) where $n$ is the order of the tested component frequency, and K is an overall constant depending upon circuit adjustments. The amplitudes of the beat frequency terms are proportional to the product of the amplitudes of the local oscillator signal and the desired component frequency. Either of the two beats can be selected, amplified, and indicated by the alternating current valve voltmeter. In practice either $E_0$ may be kept constant and the instrument calibrated in terms of absolute values of $E_n$ or calibration may be effected with $E_0$ at a convenient arbitrary value to which the indicated readings are referred to obtain absolute values of $E_n$. Obviously the positions of WT and WO can be exchanged if desired. It will be understood that the band-pass action of the filter is provided merely to facilitate adjustment and the obtaining of stable readings of the indicating meter. Again, although, in the above description, the alternating current valve voltmeter is fixed tuned, and the local oscillator is variable in frequency it will be apparent that the voltmeter may be variably tunable and the local oscillator of fixed frequency. It should be understood that the mixer circuits of Figs. 3 and 5 are intended for use in applications in which an alternating output is desired, as for instance, in wave analyzers. The fact that these circuits provide for a separate output electrode offers advantage over the circuit of Fig. 1, residing in the flexibility of using the type of input and output circuits which is most suitable for the type of signal under consideration.

Figure 8:
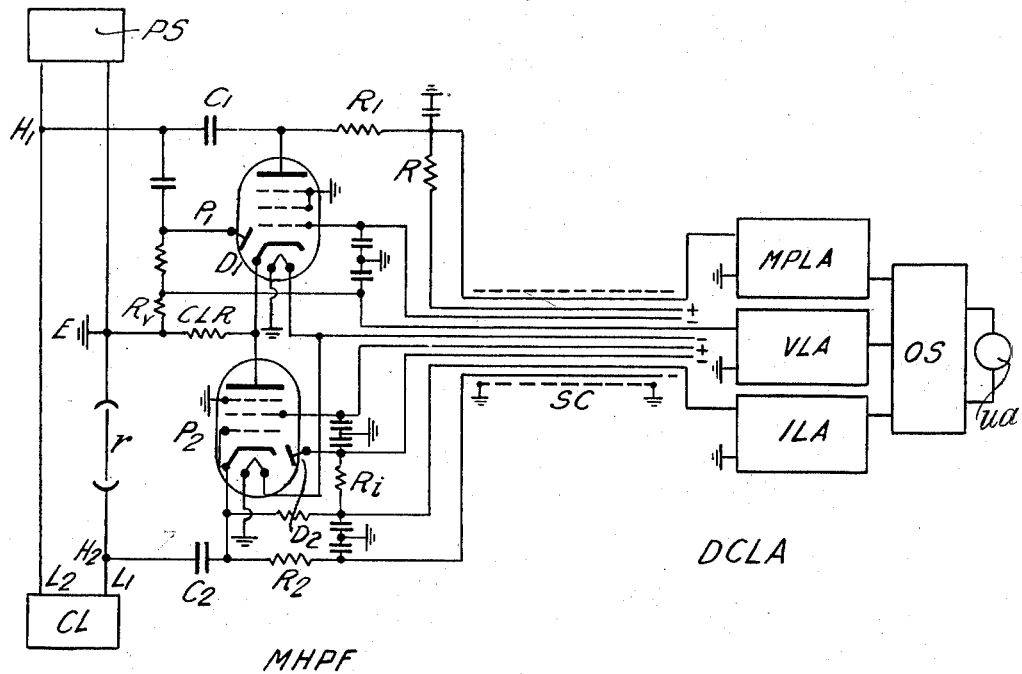

Fig. 8 shows a power-factor meter in which a mixer circuit which is essentially that of Fig. 1 is employed. This mixer circuit is housed in a measuring head MHPF connected by a screened cable SC to direct current logarithmic amplifiers generally designated DCLA and actuating an indicating instrument $ua$. The mixer circuit differs from Fig. 1 only by the addition of two single diodes $D_1$ and $D_2$ constituted, in the illustrated circuit, by diode anodes in the envelopes of the pentodes $P_1$ and $P_2$, though separate diodes could be used.

The two diodes are effectively in parallel with the input terminals of the measuring head and their action is the same as that of a conventional peak valve voltmeter. The measuring head is connected to the wires $L_1$ and $L_2$ connecting a source of power PS to a power consuming load CL . . . in the same manner as already described in connection with the wattmeter of Fig. 4. The outputs of the measuring head are of purely direct current nature and are three in number namely: a direct current output voltage taken from PEV across the resistor R; a direct current output from diode $D_1$ taken across resistor $R_v$; and a direct current output from diode $D_2$ taken across resistor $R_i$. The output voltage across R is proportional to the mean power, the output voltage across $R_v$ is proportional to the voltage and the output voltage across $R_i$ is approximately proportional to the square of the current in the circuit to which the measuring head is connected.

The direct current logarithmic amplifiers include three channels, one for each of the said three outputs of the measuring head. MPLA, VLA and ILA represent, respectively, the mean power logarithmic amplifier, the voltage logarithmic amplifier, and the current logarithmic amplifier. These three logarithmic amplifiers are pre-adjusted to operate on a common logarithmic base and their outputs are so coupled in the output circuit OS that the logarithm of the voltage is added to the logarithm of the current, and the resultant sum is subtracted from the logarithm of the mean power. Thus the final output of the logarithmic amplifiers is proportional to the logarithm of the mean power minus the logarithm of the apparent power. In other words the final output is proportional to the logarithm of the power-factor in the circuit to which the measuring head is connected.

It will now be seen that the power-factor meter described includes in effect a first arrangement for measuring the logarithm of the mean power, a second arrangement for measuring the logarithm of the apparent power, and a third arrangement for taking the difference between the two said logarithms, thus giving a final output proportional to the logarithm of the power-factor in the circuit to which the measuring head is connected.

The arrangement for measuring the logarithm of the apparent power is merely an amplitude multiplication device and can be constructed in numerous ways, other than that specifically described though the circuit described is believed to be the simplest from the point of view of construction of the measuring head.

The design details of the direct current logarithmic amplifiers are not given herein as there are numerous well-known circuits for obtaining a logarithmic indication of a direct current voltage and any of these may be employed.

It is to be understood that the two independent electrical inputs applied to the terminals of the power-factor meter should be strictly sinusoidal and of the same frequency. The said two independent electrical inputs or waves may be both voltage components or both current components or one voltage component and one current component.

Figure 9:
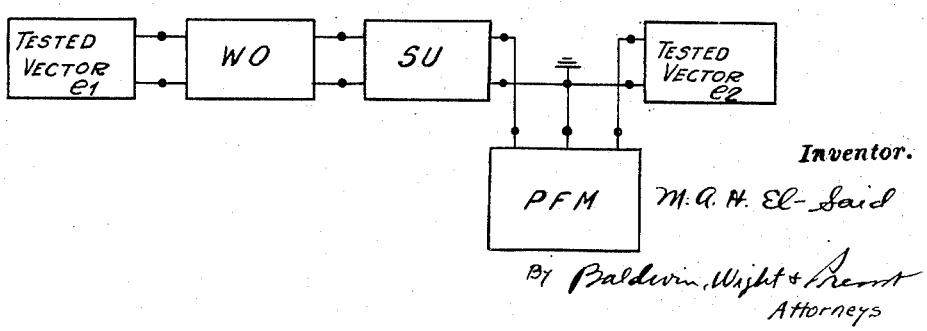

Fig. 9 shows a phase-angle meter in accordance with the invention. The term "phase-angle" as applied here refers to the equivalent "time-angle" between the positive gradient zero values of two vectors having unequal periods. The phase angle meter of Fig. 9 includes a power-factor meter generally designated PFM as already illustrated and described in connection with Fig. 8, a local oscillator WO whose oscillatory output can be mathematically represented by the well-known "Fourier Half-Range Series," and a selective unit SU connected between the local oscillator and the power-factor meter. The two vectors of unequal periods to be tested may be represented by $e_1 = E_1 \sin w_1 t$ and $e_2 = E_2 \sin (w_2 t + \phi)$ where $\phi$ is the phase-angle of the vector $e_2$ relative to the vector $e_1$ as a phase-datum. The vector $e_1$ is applied to the local oscillator for synchronization, and a particular component having a frequency $$\frac{w_2}{2\pi}$$

in the output of the local oscillator is selected by the selective unit and applied to one terminal and the earthed terminal of the power-factor meter, whilst the vector $e_2$ is directly applied to the other terminal and the earthed terminal of the power-factor meter.

The measurement of the phase-angle between the two vectors of unequal periods depends upon effecting a frequency transformation on a fixed phase-datum such that a third vector is generated whose period is same as that of one of the tested vectors but whose phase is the same as that of the other tested vector. The application of the generated vector and the tested vector whose period is the same as that of the generated vector to a power-factor meter results in an indication which is a measure of the phase-angle between the two tested vectors.

A phase-angle meter in accordance with this invention for the measurement of the phase-angle between two vectors $e_1$ and $e_2$ having, respectively, frequencies $$\frac{w_1}{2\pi} \text{ and } \frac{w_2}{2\pi}$$

such that $w_2 = m w_1$ where $m$ is a whole number, thus includes a power-factor meter and a local oscillator (as for instance a saw-tooth relaxation oscillator), whose fundamental frequency is synchronized with the vector $e_1$, and whose $m^{th}$ harmonic is selected by a selective unit and applied between one terminal and the earth terminal of the power-factor meter whilst the other terminal and the earth terminal of the power-factor meter receive vector $e_2$, the reading of the power-factor meter accordingly being a measure of the phase-angle between the said vectors $e_1$ and $e_2$.

Put more specifically, a phase-angle meter in accordance with this invention for the measurement of the phase-angle between two vectors $e_1$ and $e_2$ having, respectively frequencies $$\frac{w_1}{2\pi} \text{ and } \frac{w_2}{2\pi}$$

such that $w_1 = m_1 w$ and $w_2 = m_2 w$ where $m_1$ and $m_2$ are whole numbers and $w$ is the largest common factor of $w_1$ and $w_2$, includes a power-factor meter and a local oscillator whose output waveform is represented by a Fourier Half Range Series and whose fundamental frequency is adjusted to be equal to $$\frac{w}{2\pi}$$

its $m_1^{th}$ harmonic being synchronized with the vector $e_1$, its $m_2^{th}$ harmonic being selected by a selective unit and applied between one terminal and the earth terminal of the power-factor meter whilst the other terminal and the earth terminal of the power-factor meter receive the other vector $e_2$, the reading of the power-factor meter thus becoming a measure of the phase-angle between the said vectors $e_1$ and $e_2$ of unequal periods.

The term "synchronized" as above employed denotes two vectors becoming of the same frequency and phase, while the term "selected" refers to the extraction from a complex wave-form of a particular component frequency without said extraction causing any change in the phase of said particular component frequency. Also the term "Fourier Half-Range Series" denotes a complex wave-form in which all the harmonics of the fundamental are present and in which all said harmonics are in-phase with said fundamental.

Figure 10:
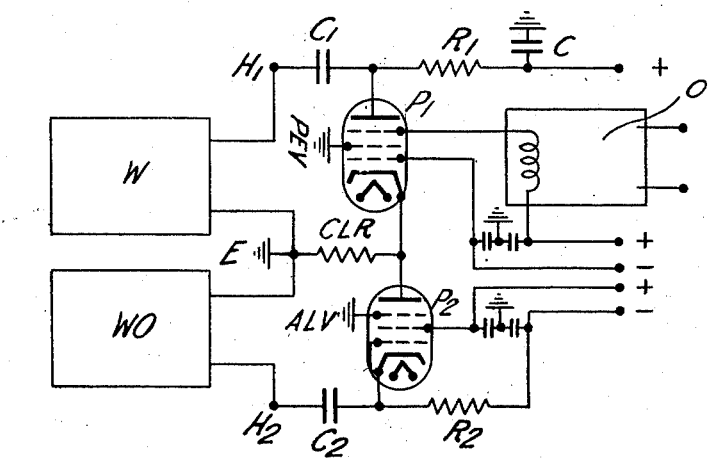

Fig. 10 illustrates a beat frequency oscillator in accordance with the invention and employing a mixer circuit generally like that of Fig. 3. Here a fixed frequency signal of frequency $f_0$ is applied from WO to the valve $P_2$ while a variable frequency $f$ is applied from a source W to the valve $P_1$. The suppressor grid current of $P_1$ includes two beat frequency components $(f_0+f)$ and $(f_0-f)$ of amplitudes proportional to the product of the amplitudes of the signals from WO and W. The output circuit, represented by the block O may take any of a variety of known frequency selective forms and is arranged to select either of these two beat frequencies for amplification as desired. The mixer circuit of Fig. 5 could obviously be similarly used to form the basis of a beat frequency oscillator.

Figure 11:
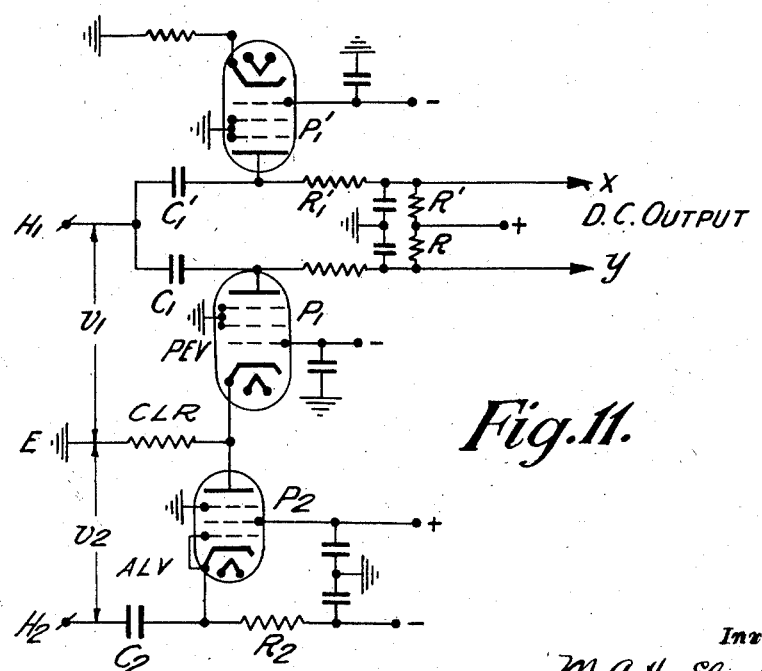

In some cases difficulties may be experienced, in carrying out the invention, due to undesired slight non-linearity in the anode current-anode voltage characteristic of the valve used at $P_1$. Such non-linearity will result in undesired partial rectification as respects $v_1$. In order to correct for this and hence improve the operating accuracy, especially at low power factors, a correcting third valve $P_1'$ may be provided in effective parallel with $P_1$, for example as shown in Fig. 11. The initial operation condition of $P_1'$ is similar to that of $P_1$ but $P_1'$ is not connected in any way to $P_2$ and responds only to $v_1$ and its output voltage appearing across $R'$ is arranged to compensate for the undesired non-linearity effects of $P_1$. Another advantage of Fig. 11 is that the D. C. output between terminals $x$ and $y$ is balanced with respect to earth.

Figure 12:
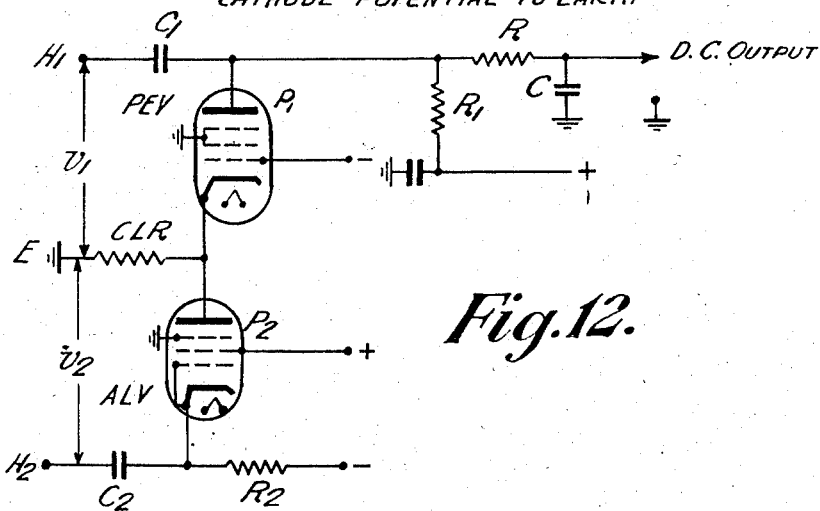

Fig. 12 which is practically self-explanatory in view of the description of Fig. 1 already given, shows a trifling modification of Fig. 1 for extracting the D. C. component in the output. The differences between Figs. 1 and 12 will be obvious and reside merely in the re-arrangement of the elements R, $R_1$ and C.

The multiplication of independent waves is obtained by the use of observed characteristics of multigrid tubes as shown in Figs. 2a and 2b relating to the tube $P_1$ in the circuit of Fig. 1, and Figs. 4a and 4b relating to tube $P_1$ in the circuit of Fig. 3. If the tube is set to operate in a region in which the above characteristics are valid, the tube acquires the property of multiplying its plate and grid voltages. I believe that I am the first to disclose these characteristics together with the multiplying property inherent in the tube under such operating characteristics.

Consider the circuit shown in Fig. 1, but assume that tube $P_2$ is absent and that the voltage $v_2$ is applied to the grid of $P_1$. If $P_1$ is set to operate in a region such that its plate current-grid voltage characteristics are as shown in Fig. 2a, while its plate current-plate voltage characteristic for a fixed grid voltage is as shown in Fig. 2b, then the plate current is expressed by:

$$I_{p_1} = (mV_{p_1} + n)\epsilon^{bV_{g_1}} \quad (1)$$

where $V_{p_1}$ and $V_{g_1}$ are the initial adjustments of plate and grid voltages respectively, $m$ and $n$ are constants, $\epsilon$ the exponential and $b$ the index or the mathematical power of the exponential and is constant irrespective of $V_p$. When the plate voltage of $P_1$ becomes $$(V_{p_1} + v_1 - i_{p_1 \text{av.}} R)$$

and the grid voltage becomes $(V_{g_1} + v_2)$ where $$i_{p_1 \text{av.}}$$

is the change in the D.-C. component of plate current consequent upon the application of plate and grid voltages, then the plate current becomes:

$$I_{p_1} + i_{p_1} = (mV_{p_1} + mv_1 - mi_{p_1 \text{av.}} R + n)\epsilon^{b(V_{g_1}+v_2)}$$
$$= (I_{p_1} + m_0 v_1 - m_0 i_{p_1 \text{av.}} R)\epsilon^{bv_2}$$

where $$m_0 = m\epsilon^{bV_{g_1}}$$

Solving for $i_{p_1}$ we get:

$$i_{p_1} = I_{p_1}(\epsilon^{bv_2} - 1) + m_0 v_1 \epsilon^{bv_2} - m_0 i_{p_1 \text{av.}} R \epsilon^{bv_2} \quad (2)$$

Assuming that $v_2$ is infinitesimally small we get:

$$i_{p_1} \cong I_{p_1} bv_2 + m_0 v_1(1+bv_2) - m_0 i_{p_1 \text{av.}} R(1+bv_2)$$

Solving for the average value of $i_{p_1}$ and considering that $$(v_1)_{\text{av.}} = (v_2)_{\text{av.}} = 0$$

by virtue of capacitive feed, we get:

$$i_{p_1 \text{av.}} = \frac{m_0}{1+m_0 R}(v_1 v_2)_{\text{av.}} \quad (3)$$

Equation 3 shows that the change in the D.-C. component of plate current of $P_1$ consequent upon the application of $v_1$ and $v_2$ is proportional to the average value of the product $(v_1 v_2)$. Since Equation 3 is derived from the assumption that $v_2$ is infinitesimally small, the output will also be infinitesimal. In order to increase the output by increasing the voltage $v_2$ and still maintain the proportionality, it is necessary to equalize the effect of the exponential term in Equation 1.

Consider now the circuit shown in Fig. 1, with the voltage $v_2$ applied to tube $P_2$ as shown. Let the plate current of $P_2$ be given by the equation:

$$I_{p_2} = C + K \ln V_{p_2} \quad (4)$$

where C is a constant and K is a constant determined from the slope of the $I_{p_2}/\ln V_p$ characteristic shown in Fig. 2c. If $V_{p_2}$ becomes $(V_{p_2} - v_2)$, the plate current of $P_2$ becomes $$I_{p_2} + i_{p_2} = C + K \ln(V_{p_2} - v_2)$$
$$= I_{p_2} + K \ln\left(1 - \frac{v_2}{V_{p_2}}\right)$$

giving $$i_{p_2} = K \ln\left(1 - \frac{v_2}{V_{p_2}}\right) \quad (5)$$

Assuming that the cathode current of $P_1$ is much smaller than the plate current of $P_2$, then the voltage developed across the resistor CLR is given by $$i_{p_2} R_2 = K R_{CL} \ln\left(1 - \frac{v_2}{V_{p_2}}\right) \quad (6)$$

where $R_{CL}$ is the magnitude of CLR. Considering now the tube $P_1$, when the plate voltage of $P_1$ becomes $$(V_{p_1}+v_1-i_{p_1\,av.}R)$$

and the grid voltage becomes $$(V_{g_1}+i_{p_2}R_{CL})$$

the plate current of $P_1$ becomes:

$$I_{p_1}+i_{p_1}=$$
$$(mV_{p_1}+mv_1-mi_{p_1\,av.}R+n)\epsilon^{bV_{g_1}}\cdot\epsilon^{bKR_{CL}\ln\left(1-\frac{v_2}{V_{p_2}}\right)}$$

If by means of a preadjustment $$bKR_{CL}=1,\text{ i. e. }R_{CL}=\frac{1}{bK}$$

then $$I_{p_1}+i_{p_1}=(I_{p_1}+m_0v_1-m_0i_{p_1\,av.}R)\left(1-\frac{v_2}{V_{p_2}}\right)$$

Solving for the average value of $i_{p_1}$ and considering that $$(V_1)_{av.}=(V_2)_{av.}=0$$

by virtue of capacitive feed, we get:

$$i_{p_1\,av.}=\frac{m_0}{1+m_0R}\cdot\frac{1}{V_{p_2}}\cdot(v_1v_2)_{av.} \quad (7)$$

Equation 7 is of the same form as Equation 3 but the contribution of tube $P_2$ in this case is to permit the increase of the output by increasing the voltage $v_2$ to such a range that may be limited to the full logarithmic voltage excursion of tube $P_2$.

By a similar analysis as above, it can be proved that the circuits in Figs. 3 and 5 perform the multiplication of the voltages $v_1$ and $v_2$ with the difference that the circuit of Fig. 1 is intended for an output of direct current nature while the circuits of Figs. 3 and 5 are for an output of alternating nature.

Referring to Equation 4, applicant uses the term "logarithmic characteristic" to denote that the plate current $I_{p_2}$ of tube $P_2$ varies logarithmically with the applied voltage $V_{p_2}$. Referring to Equation 1, applicant uses the term "exponential characteristic" to denote that the plate current $I_{p_1}$ of tube $P_1$ varies exponentially with the applied grid voltage $V_{g_1}$.

While I have described my invention in certain preferred embodiments I realize that modifications may be made and I desire that it be understood that no limitations upon my invention are intended other than may be imposed by the scope of the appended claims.

What I claim is:

1. A mixer circuit comprising in combination two vacuum tubes each having at least a cathode, a control grid, a plate and at least one grid therein between said plate and control grid, a pair of input circuits having a common point, said two tubes being connected so that the cathode of one is connected to the plate of the other, the junction point being connected to said common point by means of a coupling resistor, one of said input circuits being connected between the plate of said one tube and the common point while the other input circuit is connected between the cathode of said other tube and the common point, means for applying one input wave to one input circuit, means for applying the other input wave to the other input circuit, an output circuit for deriving from said mixer a mixed multiplied output from an output electrode in said one tube other than said cathode or control grid, said one tube being arranged and set to operate so that the current in said output electrode at any instant is proportional to the product of an exponential function of its control grid to cathode voltage and a linear function of its plate voltage, said other tube being arranged and set to operate so that its plate current varies logarithmically at any instant against its cathode to plate voltage, said coupling resistor between said two electron discharge devices being so preadjusted as to compensate accurately the instantaneous plate rectification inherent in the exponential function of said one tube by means of the instantaneous grid rectification produced by the logarithmic characteristic of said other tube such that the change in said output electrode current consequent upon the application of said two input waves constitutes three components in all, one component is proportional to the instantaneous product of said two input waves and a component proportional to each of said input waves.

2. A mixer circuit comprising in combination one multigrid tube having at least a cathode, a control grid, a screen grid, a suppressor grid, and a plate, means for operating said screen grid at a potential near that of the cathode, means for operating said control grid at a sufficiently negative potential so as to form a virtual cathode near said control grid, resulting in that the plate current is proportional to the product of an exponential function of the voltage on said control grid and a linear function of the voltage on said plate, a second vacuum tube having at least a plate and a cathode, means for arranging and operating said second tube so that its plate current at any instant varies logarithmically against its plate to cathode voltage, a coupling resistor means through which the plate current of said second tube flows giving a voltage drop which is applied in the grid circuit of said one multigrid tube, means for applying one input voltage wave to the plate of said one multigrid tube, means for applying a second input voltage wave between the cathode and plate of said second tube, said coupling resistor means between said tubes being so preadjusted as to compensate accurately the instantaneous plate rectification inherent in the exponential function of said one multigrid tube by means of the instantaneous rectification taking place in the grid circuit and produced by the logarithmic characteristic of said second tube, resulting in that the total change in the plate current of said one multigrid tube consequent upon application of said two input waves constitutes three components in all, one component proportional to the product of said two input waves, and a component proportional to each of said input waves.

3. In a valve wattmeter a mixer circuit as set forth in claim 2, means for applying a voltage input as said one input wave to said mixer, means for applying a voltage input as said second input wave to said mixer, said inputs being respectively proportional to the voltage and current respectively across and in the circuit whose power is to be measured, means for taking a direct current output from the plate of said one multigrid tube as said mixed output from said mixer and means for measuring said output as a means of measuring said power.

4. In a wave analyzer a mixer circuit as set forth in claim 1 means for applying a wave to be analyzed as said one input wave to said mixer, a local oscillator means for applying oscillations therefrom as said second input wave to said mixer, said one tube is a multigrid having a suppressor grid referred to as said output electrode, means for operating said suppressor grid at a positive voltage greater than said plate voltage, means for deriving from said suppressor grid as said mixed output an output alternating current voltage whose amplitude is proportional to the product of the amplitude of an analyzed constituent component in said wave to be analyzed and the amplitude of said local oscillation and means for measuring said output.

5. In a wave analyzer a mixer circuit as set forth in claim 1 means for applying a wave to be analyzed as said one input wave to said mixer, a local oscillator means for applying oscillations therefrom as said second input wave to said mixer, said one tube is a multigrid tube having a screen grid referred to as said output electrode, means for operating said screen grid at a positive potential greater than said plate voltage, means for deriving from said screen grid as said mixed output an output alternating current voltage whose amplitude is proportional to the product of the amplitude of an analyzed constituent component in said wave to be analyzed into the amplitude of said local oscillation and means for measuring said output.

6. In combination in a phase-angle meter for the measurement of the phase-angle between two vectors of unequal periods, a power-factor meter including means for determining the mean power in the circuit to be tested including a valve wattmeter comprising a mixer circuit set forth in claim 2, a controllable local oscillator having an output wave form shaped to effect a frequency transformation of one of the two vectors without changing its relative phase, the said power-factor meter being connected to receive as the two independent electrical quantities, said other of said vectors and a vector selected from the output of said local oscillator, the said selected vector having the same period as said other tested vector and the same phase as said one tested vector, and means for measuring the final output of said power-factor meter to measure the phase-angle of said two vectors of unequal periods.

7. A beat frequency oscillator comprising in combination a mixer circuit as set forth in claim 1 means providing two local frequencies, means for applying one local frequency as said one input wave to said mixer, means for applying the other local frequency as said second input wave to said mixer and means for selecting and taking from said mixer as the said mixed output an alternating output of a frequency equal to a beat frequency of said local frequencies.

MOHAMED ABDU HASSAN EL-SAÏD.

REFERENCES CITED

The following references are of record in the file of this patent:

UNITED STATES PATENTS

| Number | Name | Date |
| --- | --- | --- |
| 2,244,369 | Martin | June 3, 1941 |
| 2,295,615 | Tucker | Sept. 15, 1942 |
| 2,314,851 | Barney et al. | Mar. 23, 1943 |
| 2,323,762 | George | July 6, 1943 |
| 2,411,916 | Woodyard | Dec. 3, 1946 |
| 2,419,852 | Owen | Apr. 29, 1947 |